April 25, 1933.   A. F. JACKSON   1,905,717
AUTOMOBILE INDICATING DEVICE
Filed April 9, 1931   3 Sheets-Sheet 1

INVENTOR.
Alfred F. Jackson
BY Barlow & Barlow
ATTORNEYS.

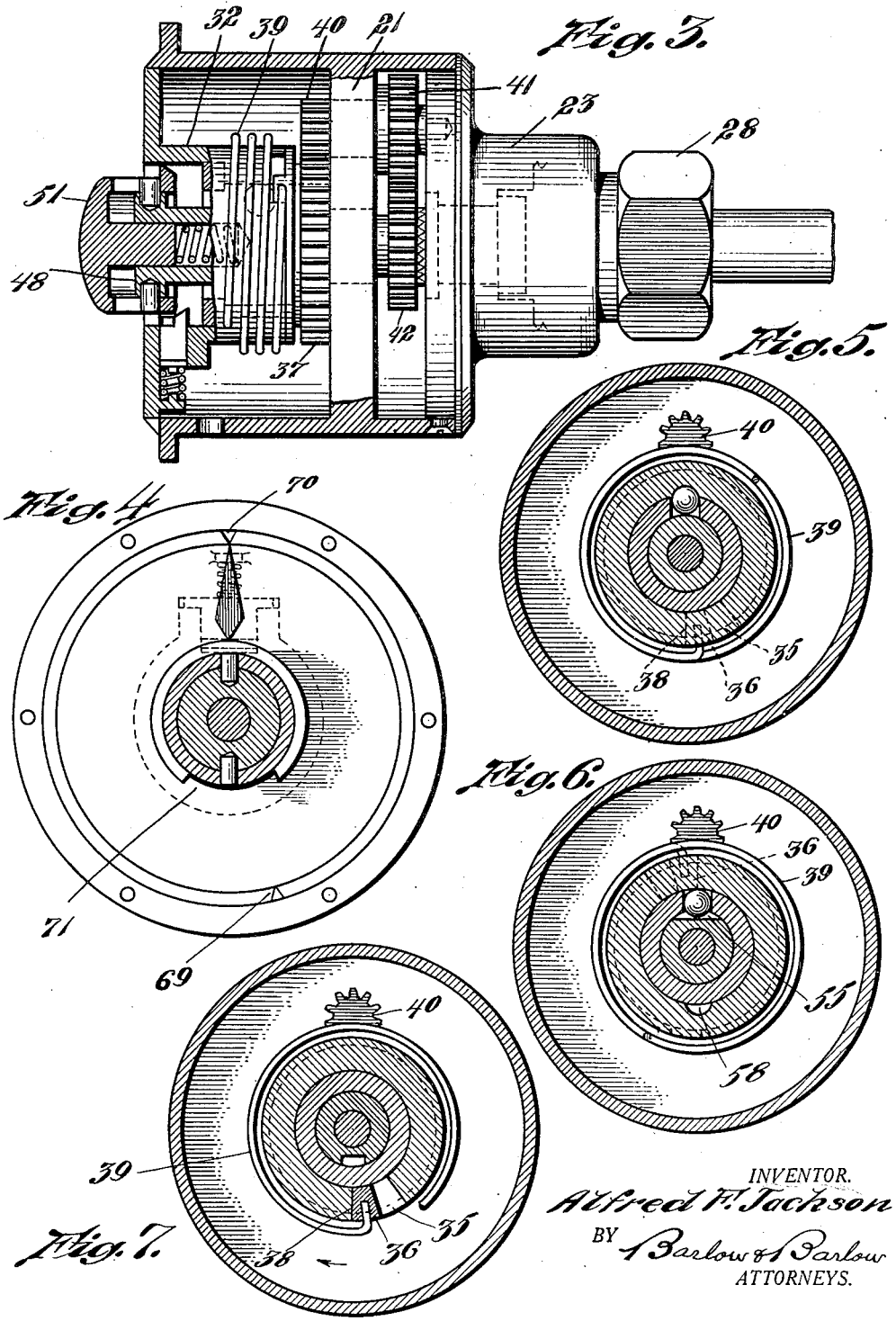

April 25, 1933.　　　A. F. JACKSON　　　1,905,717
AUTOMOBILE INDICATING DEVICE
Filed April 9, 1931　　　3 Sheets-Sheet 3
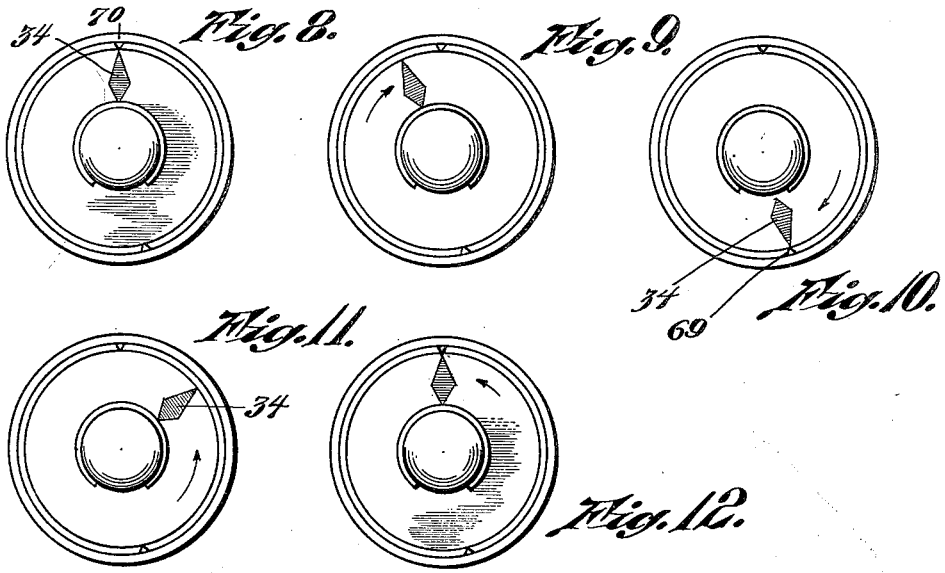
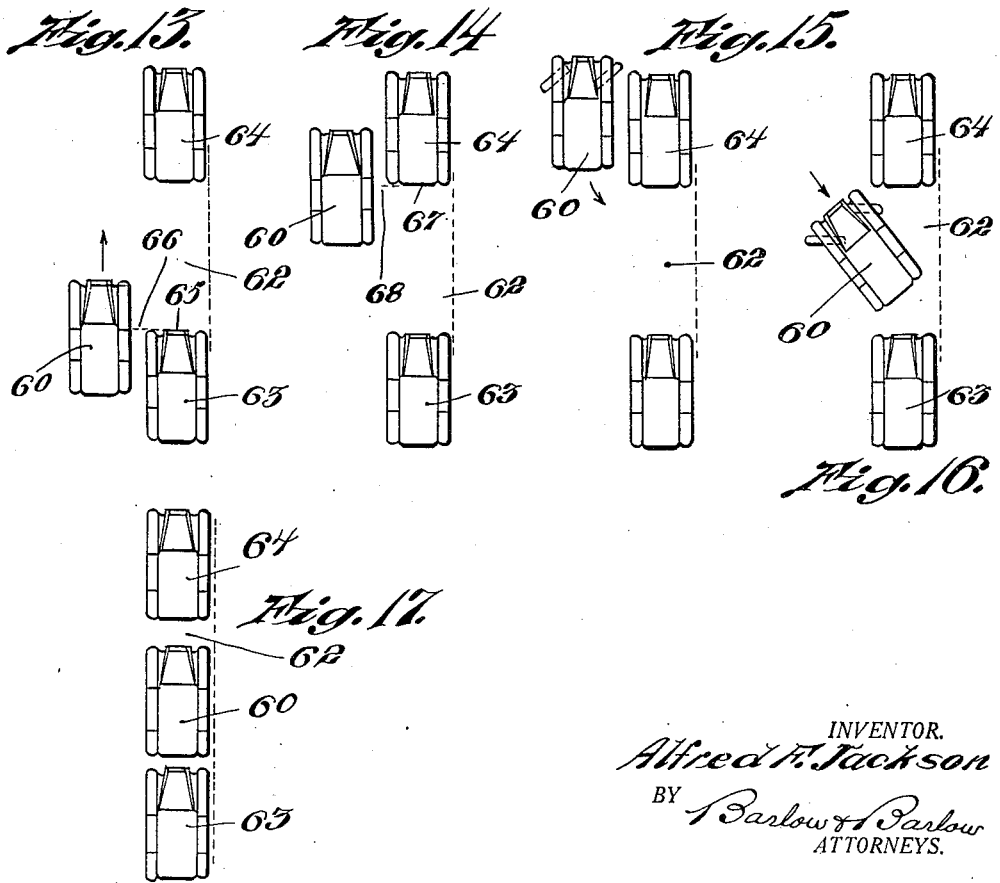
INVENTOR.
Alfred F. Jackson
BY Barlow & Barlow
ATTORNEYS.

Patented Apr. 25, 1933

1,905,717

UNITED STATES PATENT OFFICE

ALFRED F. JACKSON, OF PROVIDENCE, RHODE ISLAND, ASSIGNOR TO LEWIS R. SMITH, RECEIVER OF APCO MOSSBERG CORPORATION, A CORPORATION OF RHODE ISLAND

AUTOMOBILE INDICATING DEVICE

Application filed April 9, 1931. Serial No. 528,855.

This invention relates to a motor vehicle indicating device; and has for its object to provide an instrument which will be of use in directing an automobile into a relatively small space for parking at the curb or other place.

Another object of the invention is the provision of means by which the operator of the motor vehicle may know without trial manipulation thereof whether there is sufficient space between two previously parked vehicles at a curb for parking his vehicle therebetween.

A further object of the invention is the provision of means by which the operator may know by predetermined arrangement the proper time at which to turn the wheels of his automobile for most efficient parking thereof.

A still further object of the invention is a construction which will make an audible sound for drawing the attention of the operator to the arrival of the automobile at a predetermined position at which the steering mechanism should be moved for parking the automobile.

With these and other objects in view, the invention consists of certain novel features of construction, as will be more fully described, and particularly pointed out in the appended claims.

In the accompanying drawings:

Fig. 3 is a view partly in section showing the spring for maintaining the lost motion members in engagement at one side of the lost motion means.

Fig. 4 is a section on line 4—4 of Fig. 1.

Fig. 5 is a section on line 5—5 of Fig. 1.

Fig. 6 is a section similar to Fig. 5, showing the members as rotated to a different relative position in the casing.

Fig. 7 is a section on line 7—7 of Fig. 1.

Figs. 8, 9, 10, 11 and 12 are diagrammatic views showing the rotating dial in its different relative positions in operation of the device.

Figs. 13, 14, 15, 16 and 17 are diagrammatic views of different positions of the automobile in parking the same in the desired space, each different position corresponding to certain definite position on the indicating means.

Figure 1:
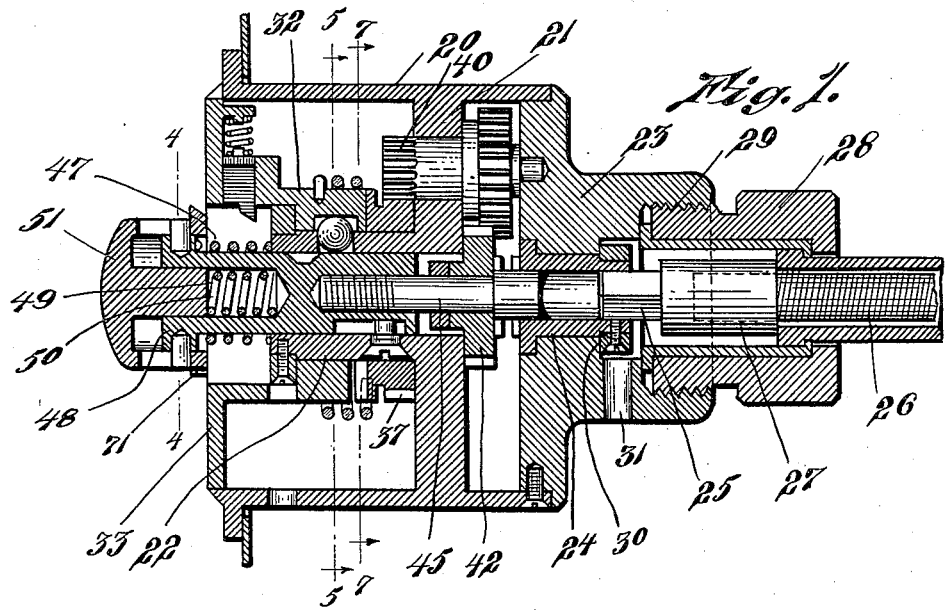
Fig. 1 is a sectional view thru one form of the device with the parts in disengaged position.

Drivers of automobiles experience difficulty in determining whether a space between two previously parked vehicles is sufficient to park the automobile he is driving. This frequently results in error of judgment of the operator to his annoyance especially in thickly trafficked parts. Further, should the space be sufficient to receive the automobile the driver frequently fails to manipulate the automobile with such skill as to permit the automobile to be parked therein efficiently, and in order that the operator may know definitely whether a certain available space is sufficient to receive the automobile driven and to also accurately determine the point at which the wheels should be turned, I have provided an indicating device which may be driven from any part which is rotated in time with the wheels of the vehicle such as a speedometer or the like and have arranged the same so that by a simple manual manipulation these desired results may be obtained; and the following is a detailed description of the present embodiment of this invention illustrating the preferred means by which these advantageous results may be accomplished.

With reference to the drawings, I have illustrated this invention as built in a separate unit which may be attached to an automobile and driven from some part rotating in time with the movement of the wheels. This structure may be built in to the speedometer or the like as an adjunct thereto rather than in a separate casing, if desired.

With reference to the drawings, the casing 20 is provided with suitable framework 21 therein including a tubular post 22 and is closed at one end by a cap member 23 in which there is positioned a rotary element 24 driven by the squared end 25 and suitable flexible shaft 26 connected therewith by a coupling 27 and held in the cap member 23 by means of the nut 28 screw-threaded thereinto as at 29, the rotary element 24 held in position by a collar secured thereto by screw 30 accessible thru the hole 31 in the cap 23. The flexible shaft 26 is connected to any suitable rotating part for movement in time with the wheels of the motor vehicle.

Rotatably mounted on the post 22 there is a driven member 32 which has integral therewith a dial plate 33 upon which there is provided a suitable indicating marker 34 as will be presently described.

This driven member is recessed in its inner end face as at 35 to receive a tooth 36 of the gear or intermediate member 37. This tooth is of a size smaller than the recess 35 and is held against one face 38 of this recess by means of a spring 39 coiled about the driven member 32 and engaging the tooth of the gear 37. This gear 37 is also rotatably mounted upon the tubular post 22 and receives its driving action by being in mesh with gear 40, it being driven by gear 41 and clutch gear 42 which may be connected to the rotary element 24 thru the clutch faces 43 on these last two mentioned parts.

Within the tubular post 22 of the casing, there is mounted an axially movable shaft or member 44 upon one reduced end of which there is a trunnion 45 which rotatably supports the clutch gear 42, the same being spaced from the end of the shaft 44 by a collar 46. A spring 47 acting between the end post 22 and the collar 48 tends to move this shaft axially to disengage the clutch gear and the rotary element 24.

Figure 2:
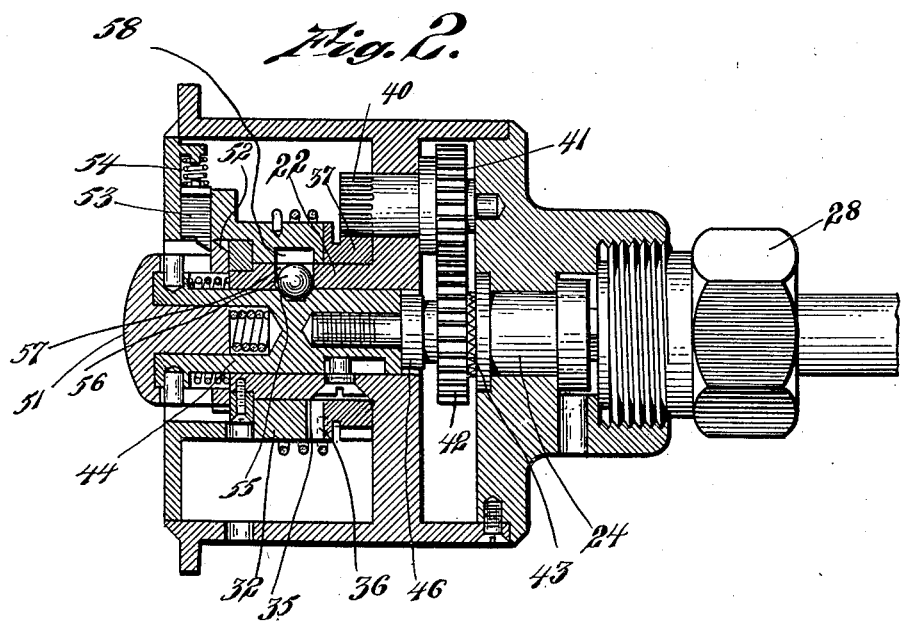
Fig. 2 is a view similar to Fig. 1 showing the parts in clutched position and ready for operation.

The shaft 44 has a bore 49 in its opposite end in which there is positioned a spring 50 which forces outwardly the push button 51 mounted at the end thereof and in order that the clutch gear and rotary element may be moved into engagement I press the manually movable button 51 inwardly to the position illustrated in Fig. 2 where its catch portion 52 is held in this position by the latch 53 spring pressed as at 54. The button 51 during its inward movement engages the axially movable member 44 at the limit of the movement of the button, as shown in Fig. 2, to then thru direct engagement with member 44 move the axially movable member and cause the clutch parts to engage.

A recess 55 is provided in the shaft 44 and receives a ball 56 which is movably located in the recess 57 in the post and which is also received in the recess 58 in the driven member 32 when the ball is in position illustrated in Fig. 1. Thus when the clutch parts are engaged the ball drops into the position illustrated in Fig. 2 to hold them in engagement after initial movement of the driven member 32 and as the driven member 32 is rotated the recess 58 moves from registry with the recess 57 in which the ball is located holding the ball in this position until this recess 58 arrives at its starting position at which time the ball will move back into the recess 57 relieving the shaft 44 and permitting disengagement of the clutch by means of the spring 47.

The latch 53 remains in engagement with the catch part 52 for a portion only of a revolution of the member 32 as this catch part 52 is cut away as at 71, so that the push button moves outwardly under influence of spring 50 upon the catch reaching recess 71 and prior to movement of the ball to permit disengagement of the clutch parts.

*Operation*

For use of this device in parking refer to Fig. 13, in which the automobile 60 is desired to be parked in space 62 between the automobiles 63 and 64. The automobile equipped with my improved device is driven to the position illustrated in Fig. 13 so that the driver is opposite the forward end 65 of the automobile 63 indicated by dotted line 66. When in this position he will press inwardly the button 51 which will be held in position by the latch 53. He will then cause the automobile to move forwardly to the position illustrated in Fig. 4 so that his line of vision will be opposite the end 67 thereof, as indicated by line 68. Should the indicator 34, as illustrated in Figs. 8 to 12, have moved one complete revolution the operator will know by predetermined arrangement of the gearing in the device that the required minimum distance for parking the automobile is available and should the pointer have arrived at the position illustrated in Fig. 9, he will know the required minimum distance is not available and must move to another location.

If the proper distance is available the button 51 will have been returned to its starting position as one revolution at least of the dial will have been made and the parts will have snapped out of engagement and further, the member 44 moving axially upon release of the ball will make a "click" or such an audible sound as to attract the operator's attention to the fact that the required distance has been reached.

For parking assuming the automobile 60 is in the position illustrated in Fig. 14 and the distance 62 is a distance sufficient for parking the automobile 60, the button 51 will again be pressed inwardly and the automobile will be advanced until the indicator reaches the position illustrated in Fig. 10 which is designated by the registering of the indicator 34 and the marker 69 on the outer part of the casing. When this location is arrived at the automobile 60 will be stopped, the front wheels will be turned as in Fig. 15, for directing the rear of the automobile 60 in the space 62 and a reverse movement will be given the automobile until the marker 34 arrives at the starting position, as illustrated in Fig. 12.

The lost motion between the tooth 36 and recess 35 will be so arranged that the automobile will move rearwardly, further than it is moved forwardly from position shown in Fig. 14 to position shown in Fig. 15 at which time the movable member 44 will be moved to starting position with a click or audible sound to notify the operator of such movement and the indicator 34 will arrive at starting position or register with the mark 70. When this position has been reached the wheels of the automobile will be turned to the position as illustrated in Fig. 16 and the automobile further reversed to bring the forward end into the space 62 between the automobiles 63 and 64 and the difficulty of parking will be consummated.

The arrangement of parts of the gearing and lost motion and the like will be prepared for each different length of automobile and different turning radius of the forward wheels so that the operator of an automobile may know before attempting to park whether the required minimum distance is available and may then park the automobile without notice or reference as to distance with respect to either the automobile ahead or behind until within the space desired.

It will of course be understood that some slight differences may be made by variation of the substantially parallel distance of the automobile 60 from the automobile 64. This distance will usually be in the neighborhood of two feet as may be judged by the operator but whether this distance be within several inches of what is desired it will make little difference in the distance the automobile finally arrives at with reference to the curb as within a few inches is sufficiently close for all practical purposes.

It will be understood that I have described the use of this device in its most comprehensive sense but the device may be used without first measuring the available space for parking in such instances where the driver estimates the distance as such as to clearly accommodate the automobile to be parked.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an automobile indicating device, a rotary element driven in predetermined relation to the wheels of the automobile, a driven member for indicating the distance traveled, means for connecting said element and member thru a lost motion device whereby movement of said element in opposite directions causes a different relative corresponding movement of said member.

2. In an automobile indicating device, a rotary element driven in predetermined relation to the wheels of the automobile, a driven member for indicating the distance traveled, clutch means for connecting or disconnecting said element and member, said means including a lost motion device whereby movement of said element in opposite directions causes a different relative corresponding movement of said member.

3. In an automobile indicating device, a rotary element driven in predetermined relation to the wheels of the automobile, a driven member for indicating the distance traveled, clutch means for connecting or disconnecting said element and member, a member for moving said clutch parts into engagement, and a spring for moving said member and clutch parts from engagement.

4. In an automobile indicating device, a rotary element driven in predetermined relation to the wheels of the automobile, a driven member for indicating the distance traveled, clutch means for connecting and disconnecting said element and member, a member for moving said clutch parts into engagement, a spring for moving said member and clutch parts from engagement, and a push button thru which said member may be moved to cause engagement of said clutch parts.

5. In an automobile indicating device, a rotary element driven in predetermined relation to the wheels of the automobile, a driven member for indicating the distance traveled, clutch means for connecting or disconnecting said element and member, a member for moving said clutch parts into engagement, a spring for moving said member and clutch parts from engagement, and means cooperating with said driven member for maintaining said clutch parts in engagement after initial movement thereof.

6. In an automobile indicating device, a rotary element driven in predetermined relation to the wheels of the automobile, a driven member for indicating the distance traveled, clutch means for connecting or disconnecting said element and member, a member for moving said clutch parts into engagement, a spring for moving said member and clutch parts from engagement, means cooperating with said driven member for maintaining said clutch parts in engagement after initial movement thereof, a push button thru which said member may be moved to cause engagement of said clutch parts, and mechanical means for temporarily holding said member in position to cause engagement of said clutch parts.

7. In an automobile indicating device, a rotary element driven in predetermined relation to the wheels of the automobile, a driven member for indicating the distance traveled, clutch means for connecting or disconnecting said element and member, a member for moving said clutch parts into engagement, a spring for moving said member and clutch parts from engagement, means cooperating with said driven member for maintaining said clutch parts in engagement after initial movement thereof, a push button thru which said member may be moved to cause engagement of said clutch parts, and mechanical means for holding said push button in position to cause engagement of said clutch parts until after said driven member has started to move.

8. In an automobile indicating device, a rotary element driven in predetermined relation to the wheels of the automobile, a driven member for indicating the distance traveled, an intermediate member, a recess in one of said members and a projection on the other member of a size less than said recess to permit a relative rotation of said member, and clutch means for connecting said intermediate member and element whereby lost motion exists between said driven member and element on reverse rotative movement of the latter.

9. In an automobile indicating device, a rotary element driven in predetermined relation to the wheels of the automobile, a driven member for indicating the distance traveled, an intermediate member, a recess in one of said members and a projection on the other member of a size less than said recess to permit a relative rotation of said member, and a spring to hold said projection against one end wall of said recess, and clutch means for connecting said intermediate member and element whereby lost motion exists between said driven member and element on reverse rotative movement of the latter.

10. In an automobile indicating device, a rotary element driven in predetermined relation to the wheels of the automobile, a driven member for indicating the distance traveled, clutch means for connecting or disconnecting said element and member, a member for moving said clutch parts into engagement, a spring for moving said member and clutch parts from engagement, and means for holding said clutch parts in engagement comprising a recess in said clutch moving member and a floating member movable thereinto and held there for a predetermined time by engagement with said driven member.

11. In an automobile indicating device, a rotary element driven in predetermined relation to the wheels of the automobile, a driven member for indicating the distance traveled, clutch means for connecting or disconnecting said element and member, a member for moving said clutch parts into engagement, a spring for moving said member and clutch from engagement, and means for holding said clutch parts in engagement comprising a recess in said driven member and a recess in said clutch moving member, and a ball movable from the recess in said driven member into the recess in said clutch moving member upon rotative movement of said driven member.

12. In a motor vehicle indicating device, a casing, a rotary element having a clutch face driven in predetermined relation to the wheels of a vehicle, a tubular post in said casing having a recess therein, a driven member rotatably supported on said post and having a recess in the bearing surface thereof and in one end face thereof, an intermediate member also rotatably supported on said post, a tooth carried thereby extending into said recess in said end face and of a width less than the width of said recess whereby reversal of rotary motion of one of said members will permit lost motion between said members, a spring for holding said tooth against one wall of said recess, an axially movable member within said tubular post having a recess therein, a clutch gear rotatably mounted thereon, a push button for moving said clutch gear into clutching engagement with said rotary element, a ball in said post recess of a size greater than the thickness of said post to extend into the recess in said axially movable member when brought into registry with the recess in the post and hold the clutching parts in engagement and to extend into the recess in said bearing surface in one relative position of rotation thereof to permit said axially movable member to move from engagement, and a catch for maintaining said push button in clutching position.

13. A method of parking an automobile by the use of a distance measuring device comprising the following steps, measuring the available parking space, advancing a measured distance therebeyond, turning the front wheel to one side substantially the limit of movement thereof, reversing by moving the automobile a measured distance, turning the front wheels substantially the opposite limit of movement and further reversing by moving the automobile into said available parking space, all without reference to any obstructions at either end of the available space after the measuring of said space.

14. A device for assisting the lateral displacement of a vehicle provided with a steering wheel through a series of forward and backward movements by indicating the various positions of the vehicle at which a change in the position of the steering wheel should be made, which device includes a movable element and means operated by the movement of the vehicle for advancing said element from a fixed point to a predetermined point at which such change should be made when the vehicle is moved forward and for retracting the element back to said fixed point at which another such change should be made when the vehicle is moved backward.

15. A device for assisting the lateral displacement of a vehicle through a series of forward and backward movements by indicating the various positions of the vehicle at which a change in such movements should be made which device includes a movable element, means operated by the movement of the vehicle for causing said element to travel in one direction from a fixed point, whereupon the vehicle is stopped and its direction of travel reversed and for causing said element to travel in the other direction back to said fixed point, and means for stopping the travel of the element upon its return to said fixed point.

16. In combination with a motor vehicle having a movable steering element and wheels whose axes are shifted by movement of said element, means for indicating the sequence of movements of the steering element requisite to produce a predetermined lateral displacement of the vehicle, said indicating means comprising a movable index and a relatively fixed datum element.

17. Apparatus for use in displacing a vehicle laterally for parking it adjacent to a curb comprising a movable index, a pair of spaced datum elements with which the index may register, and connections between the running gear of the vehicle and the index operative to move the latter successively into registry with the respective datum elements thereby indicating the proper points in the vehicle's motion at which the wheels should be swung to produce the required lateral displacement.

In testimony whereof I affix my signature.

ALFRED F. JACKSON.